United States Patent
Ogawa

(10) Patent No.: US 10,038,817 B2
(45) Date of Patent: Jul. 31, 2018

(54) IMAGE FORMING APPARATUS

(71) Applicant: KYOCERA Document Solutions Inc., Osaka-shi, Osaka (JP)

(72) Inventor: Shinya Ogawa, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/274,998

(22) Filed: Sep. 23, 2016

(65) Prior Publication Data
US 2017/0094106 A1    Mar. 30, 2017

(30) Foreign Application Priority Data

Sep. 24, 2015  (JP) ................................ 2015-187453

(51) Int. Cl.
*H04L 12/58* (2006.01)
*H04N 1/327* (2006.01)

(52) U.S. Cl.
CPC ..... *H04N 1/32708* (2013.01); *H04N 1/32717* (2013.01); *H04N 1/32728* (2013.01); *H04N 1/32756* (2013.01); *H04N 1/32767* (2013.01); *H04N 2201/0093* (2013.01); *H04N 2201/0094* (2013.01)

(58) Field of Classification Search
CPC ............................................ H04M 2203/2066
See application file for complete search history.

(56) References Cited

U.S. PATENT DOCUMENTS

| | | | | |
|---|---|---|---|---|
| 6,351,533 | B1* | 2/2002 | Parrott | H04M 19/001 379/27.01 |
| 9,553,995 | B2* | 1/2017 | Suga | H04M 7/0024 |
| 2005/0031098 | A1* | 2/2005 | Ito | H04M 1/82 379/100.01 |
| 2005/0259636 | A1* | 11/2005 | Chun | H04M 3/40 370/352 |

(Continued)

FOREIGN PATENT DOCUMENTS

| | | |
|---|---|---|
| JP | 2006270742 A | 10/2006 |
| JP | 2011071883 A | 4/2011 |

(Continued)

*Primary Examiner* — Maria El-Zoobi
(74) *Attorney, Agent, or Firm* — Alleman Hall Creasman & Tuttle LLP

(57) ABSTRACT

An image forming apparatus includes a first connection portion, a second connection portion, a communication processing portion, a switch processing portion, and a connection determination processing portion. To the switch processing portion, the first connection portion and the second connection portion are connected in parallel. The switch processing portion breaks a communication path between the second connection portion and the switch processing portion when the facsimile communication process is executed by the communication processing portion. The connection determination processing portion, when a predetermined determination start condition is satisfied, causes the switch processing portion to break the communication path, and then when a predetermined line voltage is applied to the switch processing portion, determines that a connection between the first connection portion and the public switched telephone network is normal.

7 Claims, 6 Drawing Sheets

(56) References Cited

U.S. PATENT DOCUMENTS

2006/0215229 A1* 9/2006 Ito .................... H04N 1/327
                                                    358/442
2011/0216887 A1  9/2011 Nomura

FOREIGN PATENT DOCUMENTS

| JP | 2011182315 A | 9/2011 |
| JP | 2014127833 A | 7/2014 |

* cited by examiner

IMAGE FORMING APPARATUS

INCORPORATION BY REFERENCE

This application is based upon and claims the benefit of priority from the corresponding Japanese Patent Application No. 2015-187453 filed on Sep. 24, 2015, the entire contents of which are incorporated herein by reference.

BACKGROUND

The present disclosure relates to an image forming apparatus that can transmit image data via a public switched telephone network.

In general, there is known an image forming apparatus that can execute a facsimile communication process in which image data is transmitted or received via a public switched telephone network. It is noted that in this type of image forming apparatus, it is possible to determine whether or not the public switched telephone network is normally connected by detecting a line voltage that is applied from the public switched telephone network.

SUMMARY

An image forming apparatus according to an aspect of the present disclosure includes a first connection portion, a second connection portion, a communication processing portion, a switch processing portion, and a connection determination processing portion. The first connection portion is connected to one end of a first communication line whose other end is connected to a public switched telephone network. The second connection portion is connected to one end of a second communication line whose other end is connected to a speech device. The communication processing portion executes a facsimile communication process in which image data is transmitted or received via the public switched telephone network. To the switch processing portion, the first connection portion and the second connection portion are connected in parallel. The switch processing portion breaks a communication path between the second connection portion and the switch processing portion when the facsimile communication process is executed by the communication processing portion. The connection determination processing portion, when a predetermined determination start condition is satisfied, causes the switch processing portion to break the communication path, and then when a predetermined line voltage is applied to the switch processing portion, determines that a connection between the first connection portion and the public switched telephone network is normal.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings for the understanding of the disclosure. It should be noted that the following embodiments are examples of specific embodiments of the present disclosure and should not limit the technical scope of the present disclosure.

First Embodiment

Figure 1:
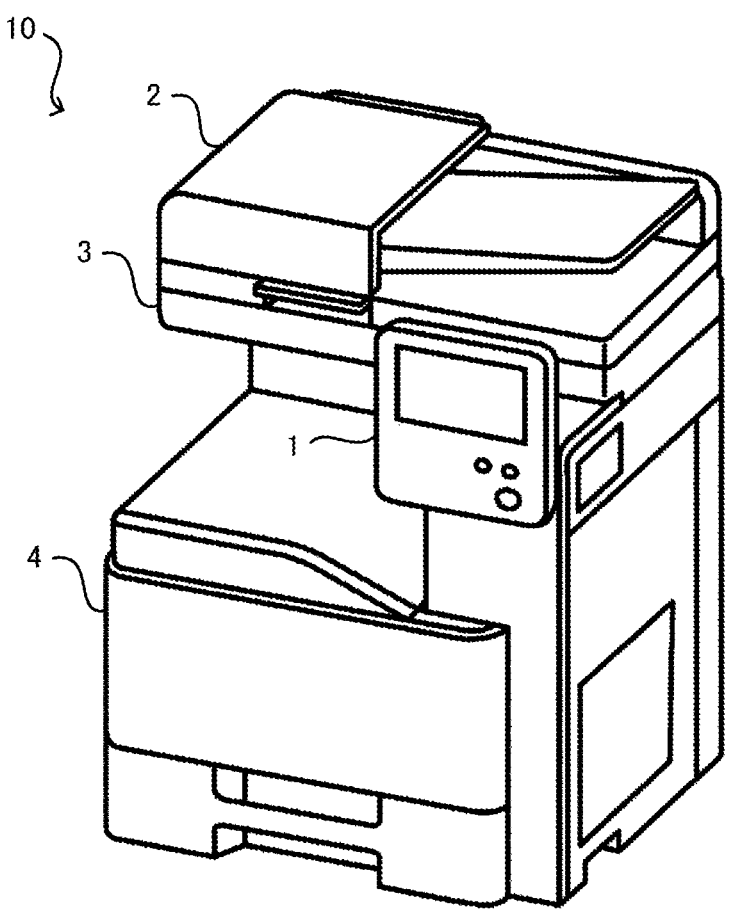
FIG. 1 is a diagram showing an outer appearance of an image forming apparatus according to a first embodiment of the present disclosure.
Figure 2:
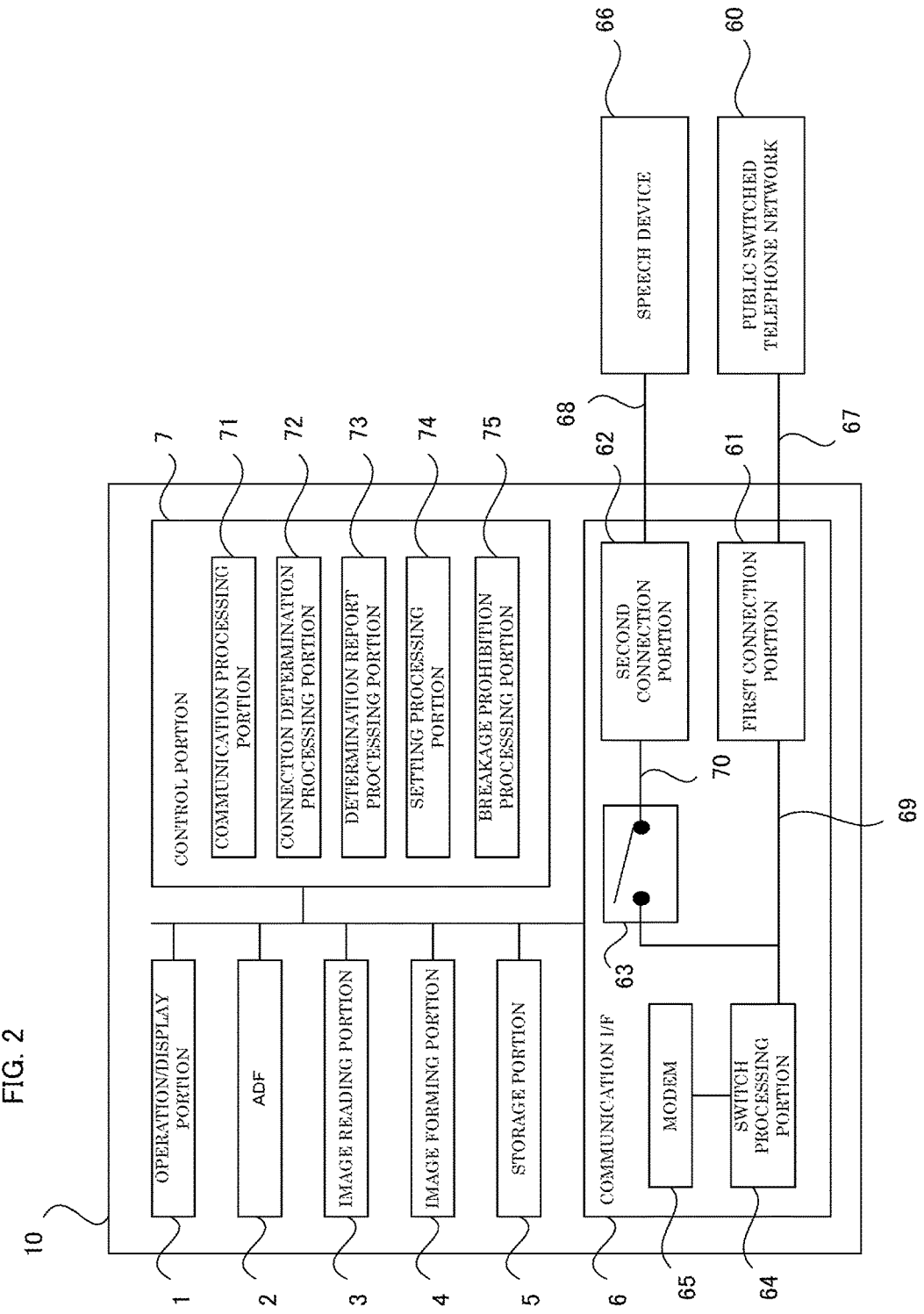
FIG. 2 is a diagram showing a system configuration of the image forming apparatus according to the first embodiment of the present disclosure.

As shown in FIG. 1 and FIG. 2, an image forming apparatus 10 according to a first embodiment of the present disclosure includes an operation/display portion 1, an ADF 2, an image reading portion 3, an image forming portion 4, a storage portion 5, a communication I/F 6, and a control portion 7. Specifically, the image forming apparatus 10 is a multifunction peripheral having a plurality of functions such as a printer function, a scanner function, a copy function, and a facsimile function. It is noted that the image forming apparatus 10 is not limited to a multifunction peripheral, but may be a facsimile apparatus having at least a facsimile function.

The operation/display portion 1 includes a display portion and an operation portion. The display portion is, for example, a liquid crystal display for displaying information. The operation portion is composed of, for example, a touch panel and operation buttons through which user operations are received. The ADF 2 is an automatic document sheet feeding device that includes a document sheet setting portion, a conveyance roller, a document sheet pressing, and a sheet discharge portion, and conveys a document sheet that is a reading target of the image reading portion 3.

The image reading portion 3 includes a document sheet table, a light source, a mirror, an optical lens, and a CCD (Charge Coupled Device), and is configured to read an image from a document sheet that is placed on the document sheet table or is conveyed by the ADF 2, and output the read image as image data.

The image forming portion 4 is configured to execute a print process by the electrophotography or the ink jet method based on the image data. When, for example, the image forming portion 4 is an electrophotographic image forming portion, the image forming portion 4 includes a photoconductor drum, a charger, an exposure device, a developing device, a transfer device, and a fixing device.

The storage portion 5 is a nonvolatile storage portion such as a hard disk or an EEPROM (registered trademark). The storage portion 5 stores the image data and various control programs that are executed by the control portion 7.

The communication I/F 6 is a communication interface configured to execute a communication process with an external facsimile apparatus via a public switched telephone network 60 (hereinafter, merely referred to as "telephone network 60") in accordance with a predetermined communication protocol. More specifically, the communication I/F 6 includes a first connection portion 61, a second connection portion 62, a breakage switch portion 63, a switch processing portion 64, and a modem 65.

The first connection portion 61 is a line-connection connector that is connected to one end of a first communication line 67 whose other end is connected to the telephone network 60. In addition, in the communication I/F 6, the first connection portion 61 is connected to the switch processing portion 64 via a first communication path 69. It is noted that, when the first connection portion 61 and the telephone network 60 are connected by the first communication line 67, a predetermined line voltage of 48 V is applied to the switch processing portion 64 from the telephone network 60.

The second connection portion 62 is a line-connection connector that is connected to one end of a second communication line 68 whose other end is connected to a speech device 66. In addition, in the communication I/F 6, the second connection portion 62 is connected to the switch processing portion 64 via a second communication path 70. The speech device 66 is a hand set telephone, an external telephone or the like which is used when the user makes a speech via the telephone network 60.

Here, the first communication line 67 and the second communication line 68 are each a two-core communication line, and the first connection portion 61 and the second connection portion 62 have the same shape. As a result, each of the first communication line 67 and the second communication line 68 can be connected to the first connection portion 61 and the second connection portion 62.

The breakage switch portion 63 is a relay circuit having a contact for switching between establishment and breakage of the second communication path 70 between the second connection portion 62 and the switch processing portion 64. The ON/OFF of the contact of the breakage switch portion 63 is controlled by the switch processing portion 64. It is noted that the breakage switch portion 63 is not limited to a relay circuit, but may be any other electronic component as far as it can realize the same function.

The switch processing portion 64, when a facsimile communication process is executed in the image forming apparatus 10, breaks the second communication path 70 between the switch processing portion 64 and the second connection portion 62 by controlling the breakage switch portion 63. In addition, when the facsimile communication process is not executed, the switch processing portion 64 establishes the second communication path 70 by controlling the breakage switch portion 63.

Furthermore, the switch processing portion 64 is configured to detect voltages applied from the first connection portion 61 and the second connection portion 62 that are connected to the switch processing portion 64 in parallel. It suffices that the switch processing portion 64 can at least determine whether or not the line voltage is applied from the first connection portion 61 and the second connection portion 62.

The modem 65 modulates image data that is to be transmitted via the telephone network 60, and demodulates image data received via the telephone network 60. Specifically, upon receiving a facsimile transmission start request from a communication processing portion 71, the modem 65 first confirms reception of a dial tone signal from the telephone network 60, and then modulates image data and transmits the modulated image data to a pre-set destination via the telephone network 60. In addition, upon receiving an incoming call signal from the telephone network 60 and then a facsimile reception start request from the communication processing portion 71, the modem 65 closes the telephone network 60, receives image data via the telephone network 60, and demodulates the received image data. Thereafter, upon completion of the facsimile transmission or the facsimile reception, the modem 65 opens the telephone network 60.

Furthermore, upon receiving a telephone start request from the communication processing portion 71, the modem 65 first confirms reception of a dial tone signal from the telephone network 60, and then sends a call signal to a pre-set destination via the telephone network 60. In addition, upon receiving an incoming call signal from the telephone network 60 and then detecting an on-hook of the speech device 66, the modem 65 closes the telephone network 60 and enables a speech to be made on the speech device 66. Thereafter, upon detecting an off-hook of the speech device 66, the modem 65 opens the telephone network 60.

The control portion 7 includes control equipment such as CPU, ROM, and RAM, and controls the components of the image forming apparatus 10. The CPU is a processor that executes various calculation processes. The ROM is a nonvolatile storage portion in which various information such as control programs for causing the CPU to execute various processes are stored in advance. The RAM is a volatile or nonvolatile storage portion, and is used as a temporary storage memory (working area) for the various processes executed by the CPU.

The control portion 7 causes the CPU to execute the control programs stored in the ROM or the storage portion 5. For example, the control portion 7 executes a facsimile transmission process of transmitting image data via the telephone network 60, in accordance with a control program. In addition, the control portion 7 executes a connection determination process that is described below, in accordance with a control program.

Meanwhile, there is a possibility that the user reversely connect the first communication line 67 and the second communication line 68 by error to the second connection portion 62 and the first connection portion 61 in the image forming apparatus 10. On the other hand, in the image forming apparatus 10, the control portion 7 executes the connection determination process that is described below, so as to detect whether or not the first connection portion 61 and the second connection portion 62 are correctly connected.

Specifically, the control portion 7 includes the communication processing portion 71, a connection determination processing portion 72, a determination report processing portion 73, a setting processing portion 74, and a breakage prohibition processing portion 75. It is noted that the control portion 7 functions as the processing portions by causing the CPU to execute various processes in accordance with the control programs.

The communication processing portion 71 executes the facsimile communication process of transmitting/receiving image data via the telephone network 60 by controlling the communication I/F 6. Specifically, when a telephone number as a destination is input and a facsimile transmission start request operation is performed on the operation/display portion 1, the communication processing portion 71 executes the facsimile transmission process in which it transmits a facsimile transmission start request to the communication I/F 6 and then transmits the image data to the communication I/F 6. In addition, when the modem 65 detects an incoming call from the telephone network 60, the communication processing portion 71 executes a facsimile reception process of automatically transmitting a facsimile reception start request to the modem 65 and receiving the image data via the telephone network 60. Furthermore, when a telephone number as a destination is input and a telephone start request operation is performed on the operation/display portion 1, the communication processing portion 71 transmits a telephone start request to the communication I/F 6.

The connection determination processing portion 72, when a predetermined determination start condition is satisfied, causes the switch processing portion 64 to break the second communication path 70 between the second connection portion 62 and the communication processing portion 71. In addition, when the predetermined line voltage of 48 V is applied to the switch processing portion 64 in the state where the second communication path 70 is broken, the connection determination processing portion 72 determines that the connection between the first connection portion 61 and the telephone network 60 is normal. It is noted that the determination start condition is, for example, that a predetermined user operation is performed, or that a predetermined communication abnormality occurs.

The determination report processing portion 73 reports the determination result of the connection determination processing portion 72. Specifically, when the connection determination processing portion 72 at least determines that the first connection portion 61 is not normally connected to the telephone network 60, the determination report processing portion 73 reports the determination as the determination result of the connection determination processing portion 72. In addition, when the connection determination processing portion 72 determines that the first connection portion 61 is normally connected to the telephone network 60, the determination report processing portion 73 reports the determination as the determination result of the connection determination processing portion 72.

The setting processing portion 74 is configured to receive, during a system setting or an initial setting of the image forming apparatus 10, a setting of presence or absence of connection to the speech device 66. When the setting processing portion 74 sets absence of the connection to the speech device 66, the breakage prohibition processing portion 75 prohibits the switch processing portion 64 from breaking the second communication path 70. That is, when the speech device 66 is not connected to the image forming apparatus 10, the second communication path 70 is always established. In this case, even in a case where the facsimile communication process is executed, the contact of the breakage switch portion 63 is not turned OFF, and both the first communication path 69 and the second communication path 70 are connected to the switch processing portion 64. As a result, even if the telephone network 60 is erroneously connected to the second connection portion 62, the communication processing portion 71 can execute the facsimile communication process via the switch processing portion 64, the breakage switch portion 63, the second connection portion 62, and the telephone network 60.

[Example of Connection Determination Process]

Figure 3:
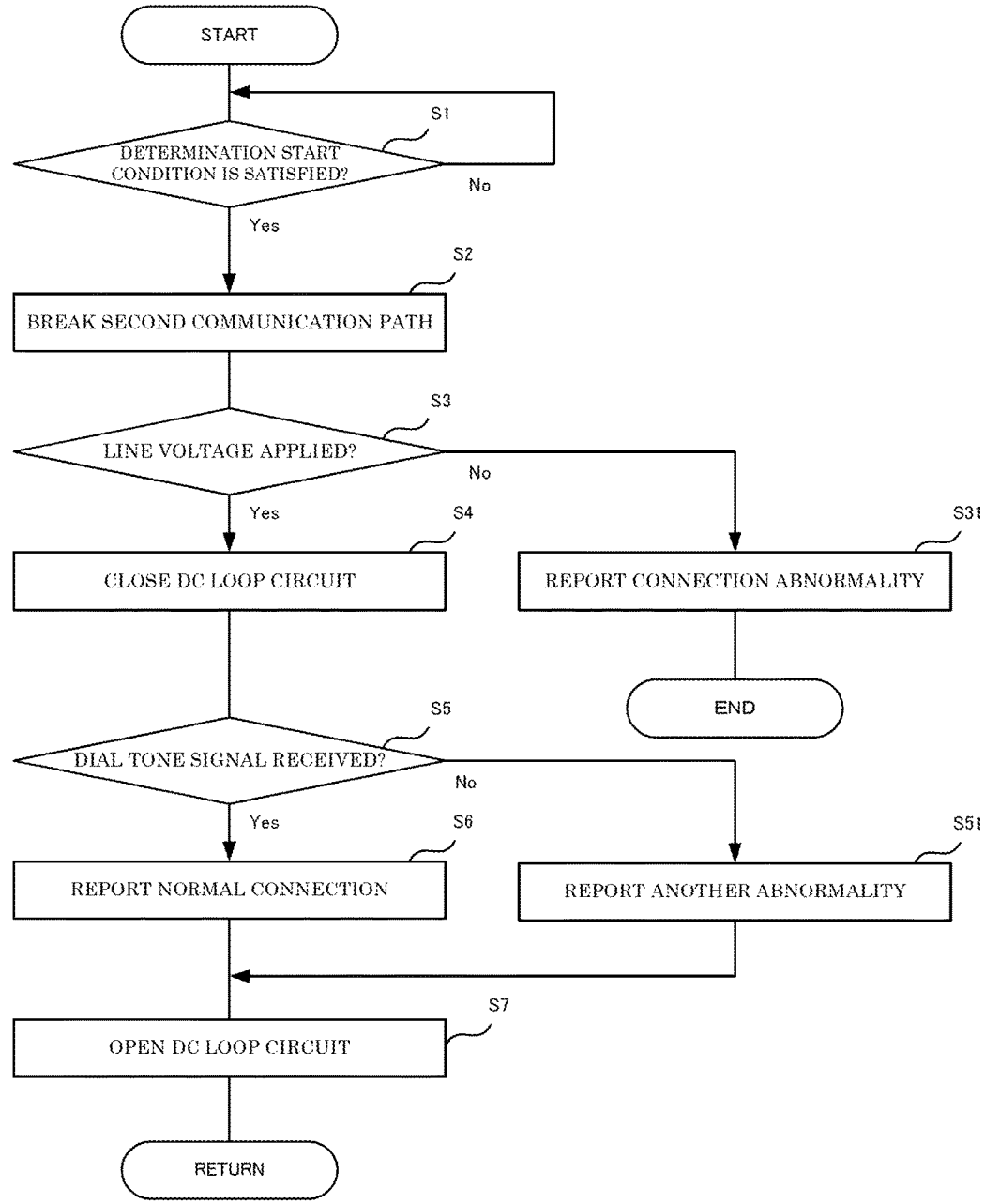
FIG. 3 is a flowchart showing an example of a connection determination process that is executed in the image forming apparatus according to the first embodiment of the present disclosure.

The following explains the procedure of the connection determination process executed by the control portion 7 in the image forming apparatus 10, with reference to FIG. 3.

Here, steps S1, S2, . . . represent numbers assigned to processing procedures (steps) executed by the control portion 7.

<Step S1>

In step S1, the control portion 7 determines whether or not the predetermined determination start condition is satisfied. It is noted that step S1 is executed by the connection determination processing portion 72 of the control portion 7. Here, the determination start condition is, for example, that a user operation requesting the execution of a connection confirmation mode is performed on the operation/display portion 1. In addition, the determination start condition includes that a communication abnormality such as a communication time-out occurs at the execution start of the facsimile transmission process. It is noted that the process waits at step S1 while the control portion 7 determines that the determination start condition is not satisfied (S1: No).

On the other hand, upon determining that the determination start condition is satisfied (S1: Yes), the control portion 7 causes the operation state of the image forming apparatus 10 to a connection confirmation mode that is different from the normal operation mode, and moves the process to step S2. It is noted that in the connection confirmation mode, the communication processing portion 71 of the control portion 7 prohibits the modem 65 from responding to an incoming call from the telephone network 60. This prevents an unintended telephone conversation or facsimile reception from starting.

<Step S2>

In step S2, the control portion 7 causes the breakage switch portion 63 to break the second communication path 70. With this operation, when the telephone network 60 is connected to the second connection portion 62, the application of the line voltage from the telephone network 60 to the switch processing portion 64 is stopped. It is noted that step S2 is executed by the connection determination processing portion 72 of the control portion 7.

<Step S3>

In step S3, the control portion 7 determines whether or not the line voltage is applied to the switch processing portion 64. Here, when it is determined that the line voltage is applied (S3: Yes), the process moves to step S4; and when it is determined that the line voltage is not applied (S3: No), the process moves to step S31. It is noted that step S3 is executed by the connection determination processing portion 72 of the control portion 7.

In an example case provided in the present embodiment, the process moves to step S4 when it is determined that the line voltage is applied. On the other hand, when it is determined that the line voltage is applied, the control portion 7 may determine that the connection between the first connection portion 61 and the telephone network 60 is normal, and move the process to step S6.

<Step S31>

In step S31, the control portion 7 reports a connection abnormality of the first communication line 67. More specifically, the control portion 7 indicates on the operation/display portion 1 that the telephone network 60 is not connected to the first connection portion 61. It is noted that step S31 is executed by the determination report processing portion 73 of the control portion 7.

<Step S4>

In step S4, the control portion 7 closes a DC loop circuit in which the first communication path 69 and the second communication path 70 are connected in parallel, and brings the apparatus into a state where a call can be made via the telephone network 60. In this state, when the connection between the first connection portion 61 and the telephone network 60 is normal, a dial tone signal sent from the telephone network 60 is detected by the modem 65. On the other hand, when the first connection portion 61 is not connected to the telephone network 60 normally, a dial tone signal sent from the telephone network 60 is not detected by the modem 65. It is noted that step S4 is executed by the connection determination processing portion 72 of the control portion 7.

<Step S5>

In step S5, the control portion 7 determines whether or not a dial tone signal has been detected by the modem 65. Here, upon determining that a dial tone signal has been detected (S5: Yes), the control portion 7 determines that the connection between the first connection portion 61 and the telephone network 60 is normal, and moves the process to step S6. That is, when the line voltage is applied to the switch processing portion 64, and a dial tone signal from the telephone network 60 is received, the control portion 7 determines that the connection between the first connection portion 61 and the telephone network 60 is normal. On the other hand, upon determining that a dial tone signal has not been detected (S5: No), the control portion 7 determines that the connection between the first connection portion 61 and the telephone network 60 is abnormal, and moves the process to step S51. It is noted that step S5 is executed by the connection determination processing portion 72 of the control portion 7.

<Step S51>

In step S51, the control portion 7 reports another abnormality. Other abnormalities include a communication abnormality of the telephone network 60, and an operation abnormality of the modem 65. It is noted that step S51 is executed by the determination report processing portion 73 of the control portion 7.

<Step S6>

In step S6, the control portion 7 reports that the first communication line 67 is normally connected. More specifically, the control portion 7 indicates on the operation/display portion 1 that the first communication line 67 is normally connected to the first connection portion 61. It is noted that step S6 is executed by the determination report processing portion 73 of the control portion 7.

<Step S7>

In step S7, the control portion 7 opens the DC loop circuit that was closed in step S4, moves the operation state of the image forming apparatus 10 from the operation confirmation mode to the normal operation mode, and then ends the connection determination process.

As described above, in the image forming apparatus 10, it is determined whether or not the telephone network 60 is normally connected to the first connection portion 61, based on the determination result on whether or not the line voltage is applied to the first connection portion 61 in the state where the second communication path 70 is broken. As a result, even when the speech device 66 is connected to the first connection portion 61, and the telephone network 60 is connected to the second connection portion 62, it is possible to detect a state where the telephone network 60 is not normally connected to the first connection portion 61.

Furthermore, in the image forming apparatus 10, even when it is determined that the line voltage is applied to the first connection portion 61, it is further determined whether or not a dial tone signal is received, and on condition that a dial tone signal is received, it is determined that the first connection portion 61 and the telephone network 60 are normally connected. This makes it possible to detect that the first connection portion 61 and the telephone network 60 are not normally connected even in a case where, for example, the same voltage as the line voltage is applied to the first connection portion 61 from a device that is connected thereto in place of the telephone network 60.

Second Embodiment

Figure 4:
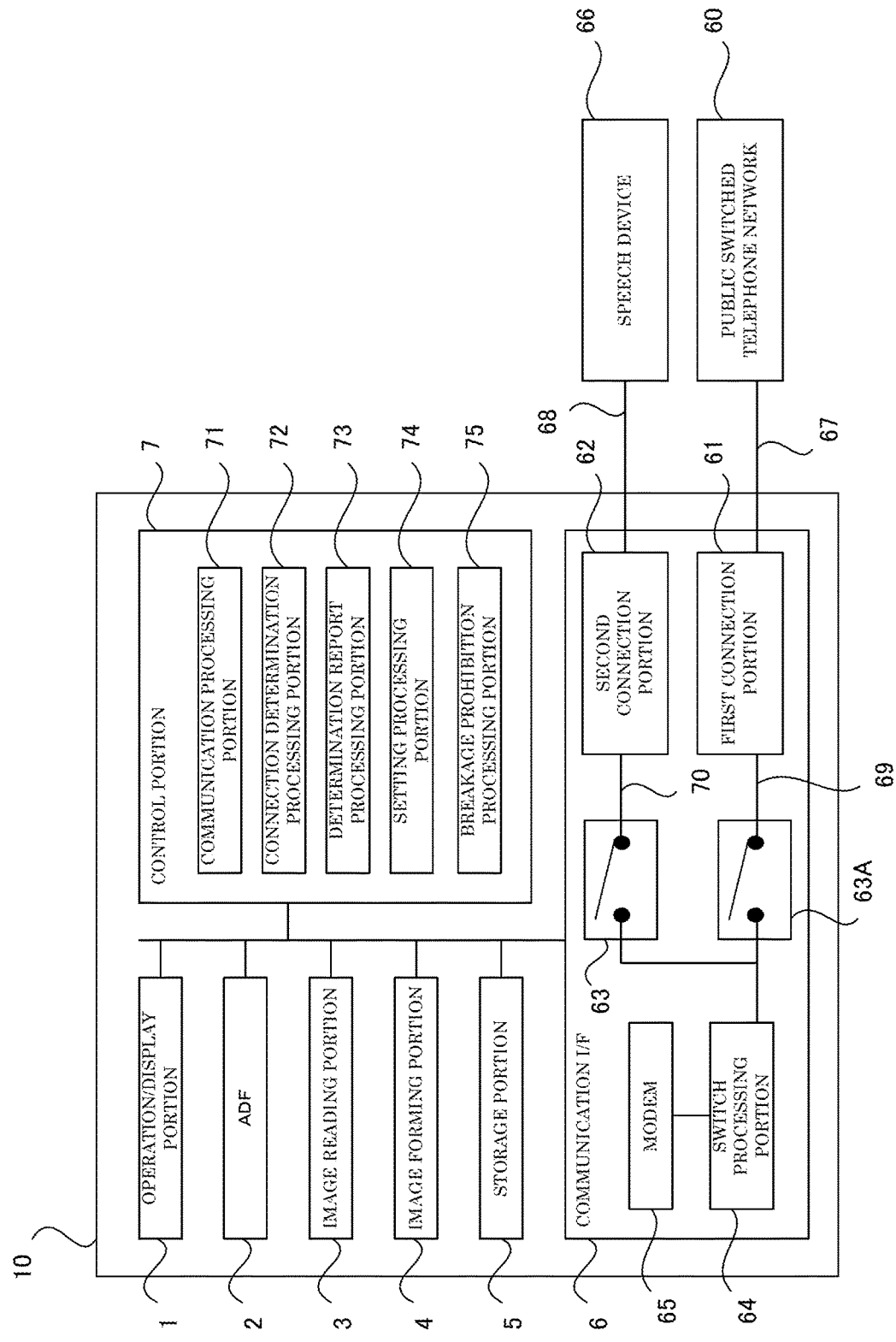
FIG. 4 is a diagram showing a system configuration of the image forming apparatus according to a second embodiment of the present disclosure.
Figure 5:
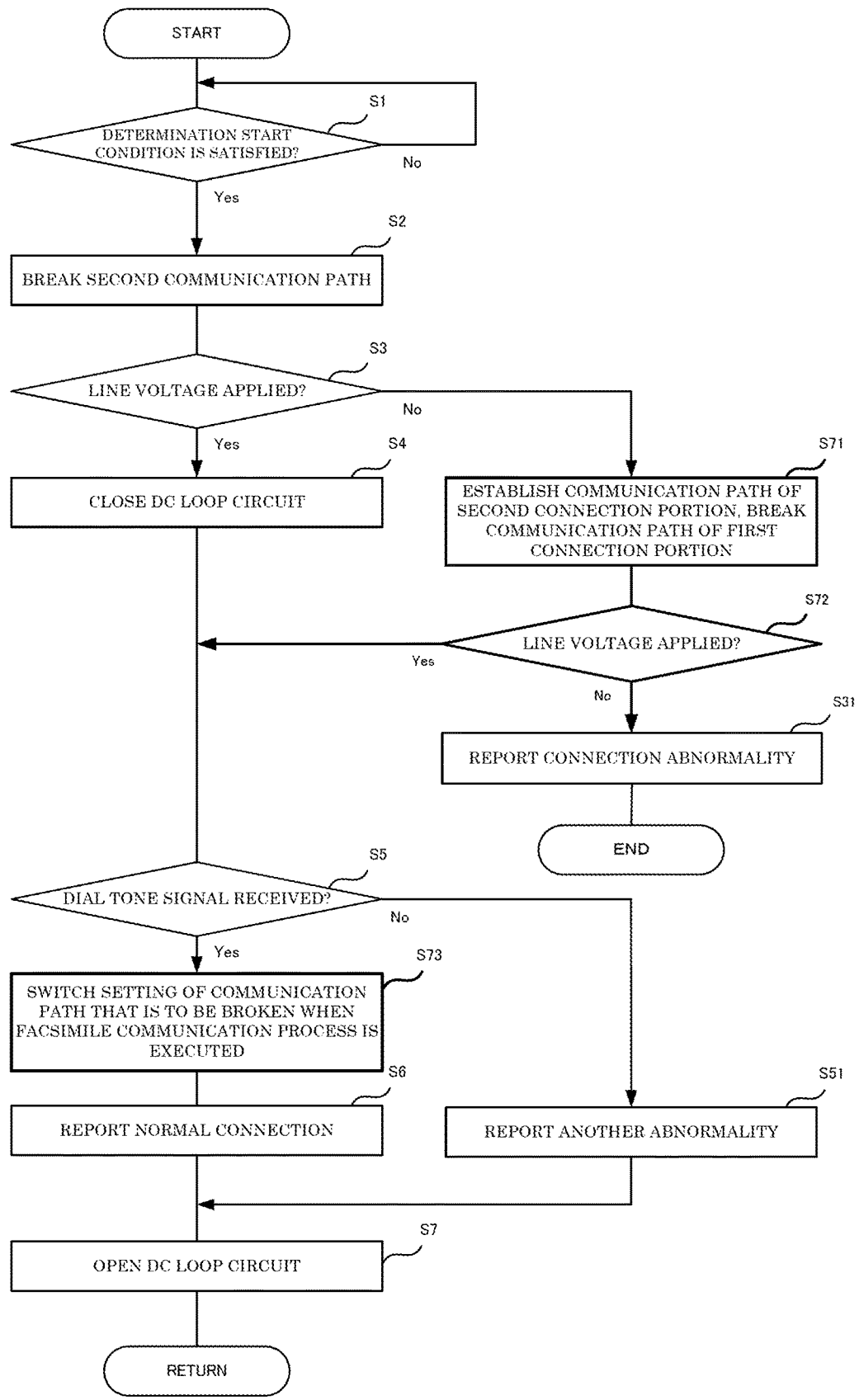
FIG. 5 is a flowchart showing an example of the connection determination process that is executed in the image forming apparatus according to the second embodiment of the present disclosure.

FIG. 4 is a diagram showing a system configuration of the image forming apparatus 10 according to a second embodiment of the present disclosure. FIG. 5 is a flowchart showing an example of the connection determination process that is executed in the image forming apparatus 10 according to the second embodiment of the present disclosure.

In the communication I/F 6 shown in FIG. 4, a breakage switch portion is provided on the first communication path 69 as well, wherein a breakage switch portion 63A on the first communication path 69 is the same as the breakage switch portion 63. The control portion 7 executes the connection determination process shown in FIG. 5. It is noted that processing procedures that are the same as those provided in the connection determination process shown in FIG. 3 are assigned the same reference signs, and description thereof is omitted. Specifically, in the connection determination process shown in FIG. 5, steps S71 through S73 are provided in addition to steps S1 through S7 for execution.

<Step S71>

When it is determined that the first connection portion 61 and the telephone network 60 are not normally connected (S3: No), the control portion 7 executes steps S71 through S72 immediately before step S31. Specifically, in step S71, the control portion 7 establishes the second communication path 70 by turning ON the contact of the breakage switch portion 63, and breaks the first communication path 69 by turning OFF the contact of the breakage switch portion 63A. It is noted that steps S71 through S72 are executed by the connection determination processing portion 72 of the control portion 7.

Figure 6:
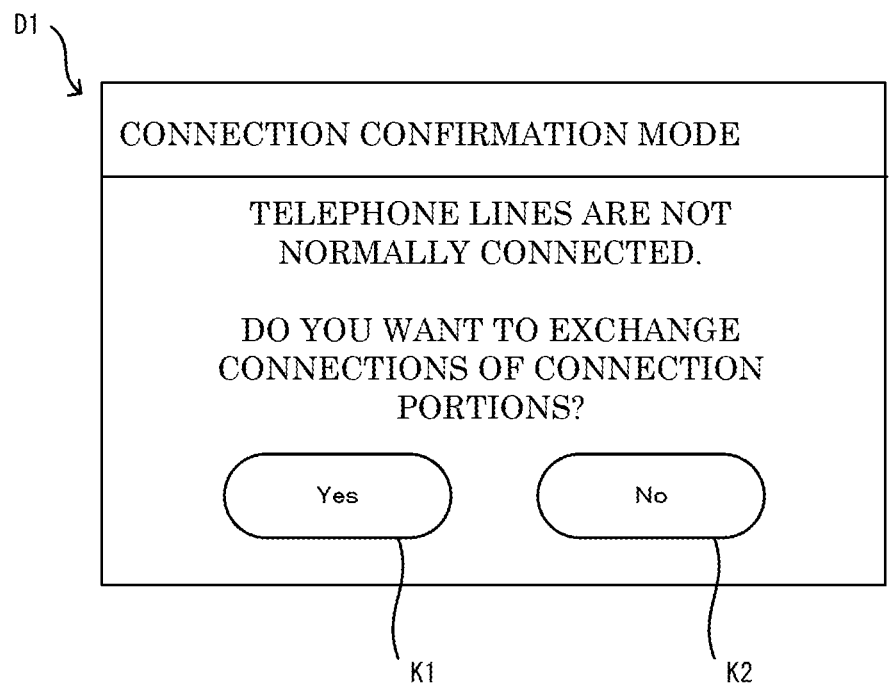
FIG. 6 is a diagram showing an example of a display screen displayed on the image forming apparatus according to the second embodiment of the present disclosure.

In addition, immediately before step S71, the control portion 7 may display, on the operation/display portion 1, an operation screen D1 for confirming whether or not an exchange between the first communication path 69 and the second communication path 70 is executed. FIG. 6 is a diagram showing an example of the operation screen D1.

When an operation key K1 is operated on the operation screen D1, the control portion 7 executes the step S71, wherein the operation key K1 indicates execution of the exchange between the first communication path 69 and the second communication path 70. In addition, when an operation key K2 is operated on the operation screen D1, the control portion 7 moves the process to step S31 without executing the step S71, wherein the operation key K2 indicates no execution of the exchange between the first communication path 69 and the second communication path 70.

<Step S72>

Next, in step S72, the control portion 7, as in step S3, determines whether or not the line voltage is applied to the switch processing portion 64. Here, when it is determined that the line voltage is not applied (S72: No), the process moves to step S31. That is, when the line voltage is not applied to any of the first connection portion 61 and the second connection portion 62, a connection abnormality is reported in step S31.

On the other hand, when it is determined that the line voltage is applied (S72: Yes), the process moves to step S5 in which the control portion 7 determines whether or not a dial tone signal has been detected by the modem 65. Upon determining that a dial tone signal has been detected (S5: Yes), the control portion 7 determines that the telephone network 60 is connected to the second connection portion 62, and moves the process to step S73.

<Step S73>

In step S73, the control portion 7 switches the setting of the communication path that is to be broken when the facsimile communication process is executed, from the second communication path 70 to the first communication path 69. Specifically, the control portion 7 transmits the content of the setting of the communication path that is to be broken when the facsimile communication process is executed, to the switch processing portion 64 via the modem 65. With this configuration, in the case where the telephone network 60 is connected to the second connection portion 62, the switch processing portion 64 sets the contact of the breakage switch portion 63A to OFF so that the first communication path 69 is broken when the facsimile communication process is executed.

As described above, in the image forming apparatus 10 according to the second embodiment, from between the first communication path 69 and the second communication path 70, a communication path that is connected to the telephone network 60 is selected for use in the facsimile communication process. On the other hand, between the first communication path 69 and the second communication path 70, a communication path that is not connected to the telephone network 60 is broken when the facsimile communication process is executed. That is, even if the user reversely connects the telephone network 60 and the speech device 66 to the first connection portion 61 and the second connection portion 62 by error, it is possible to normally use the image forming apparatus 10 without changing the connections.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
a first connection portion configured to connect to one end of a first communication line whose other end is connected to a public switched telephone network;
a second connection portion configured to connect to one end of a second communication line whose other end is connected to a speech device;
a communication processing portion configured to execute a facsimile communication process in which image data is transmitted or received via the public switched telephone network;
a switch processing portion to which the first connection portion and the second connection portion are connected in parallel, and configured to break a communication path between the second connection portion and the switch processing portion when the facsimile communication process is executed by the communication processing portion; and
a connection determination processing portion configured to, when a predetermined determination start condition is satisfied, cause the switch processing portion to break the communication path, and then when a predetermined line voltage is applied to the switch processing portion, determine that the first connection portion is connected to the public switched telephone network, and when the line voltage is not applied to the switch processing portion, determine that the first connection portion is not connected to the public telephone network, wherein
the first connection portion always connects to the switch processing portion, and the switch processing portion switches between:
a connection between the switch processing portion and the second connection portion; and
a breakage between the switch processing portion and the second connection portion.

2. The image forming apparatus according to claim 1, wherein
in a case where the line voltage is applied to the switch processing portion, and a predetermined dial tone signal is received from the public switched telephone network, the connection determination processing portion determines that the first connection portion is connected to the public switched telephone network.

3. The image forming apparatus according to claim 1 further comprising
a setting processing portion configured to receive a setting of presence or absence of connection to the speech device; and
a breakage prohibition processing portion configured to, when the setting processing portion sets absence of the connection to the speech device, prohibit the switch processing portion from breaking the communication path.

4. The image forming apparatus according to claim 1 further comprising
a determination report processing portion configured to report a determination result of the connection determination processing portion.

5. The image forming apparatus according to claim 1, wherein
the determination start condition is that a predetermined user operation is performed.

6. The image forming apparatus according to claim 1, wherein
the determination start condition is that a communication time-out occurs.

7. The image forming apparatus according to claim 1, wherein
when the determination start condition is satisfied, the connection determination processing portion breaks the communication path, and then when the line voltage is applied to the switch processing portion, closes a DC (direct current) loop circuit in which the first communication line and the second communication line are connected, and when the line voltage is applied to the switch processing portion, and a predetermined dial tone signal is received from the public switched telephone network, determines that the first connection portion is connected to the public switched telephone network.

* * * * *